Sept. 3, 1946.  K. MILLER  2,407,029
HORSE EYESHIELD
Filed Nov. 5, 1943
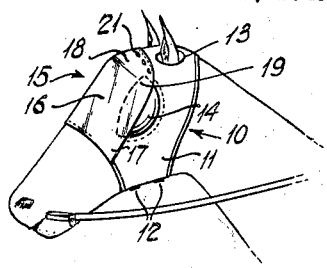
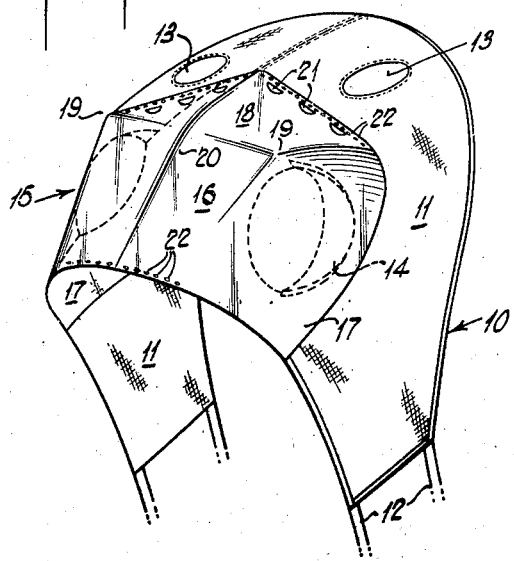
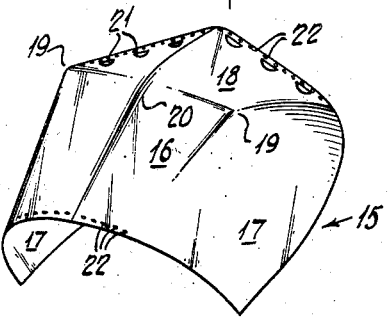
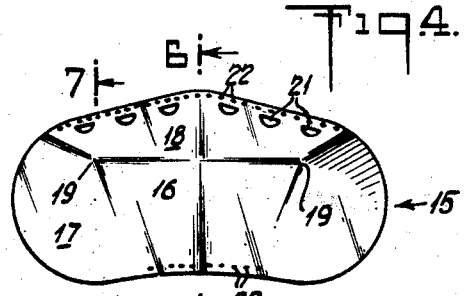
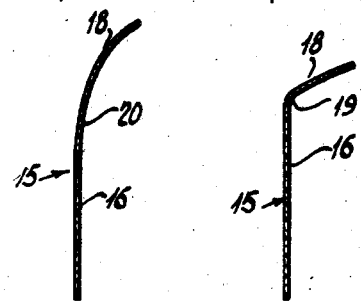
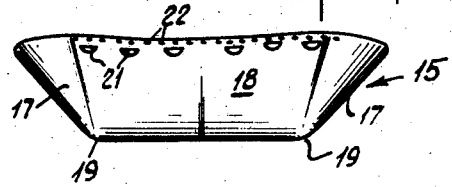
INVENTOR
KENT MILLER.
BY
ATTORNEY Patented Sept. 3, 1946

2,407,029

UNITED STATES PATENT OFFICE 2,407,029

HORSE EYESHIELD

Kent Miller, Aiken, S. C.

Application November 5, 1943, Serial No. 509,100

2 Claims. (Cl. 54—80)

This invention relates to a horse eye shield, and more particularly to a shield for protecting the eyes of a race horse.

In my experience in training race horses I have found that their eyes are often injured, and that sometimes the eyesight is destroyed or permanently impaired, by particles of matter thrown up from the track with considerable force by the hoofs of the running horses.

Among the objects of the present invention are to provide an eye shield that can be used in conjunction with the ordinary blinker to protect the eyes completely, that is light in weight and strong, that will not cloud or fog in use, and that will not cause discomfiture or interference either in the starting gate or during the running of a race.

The invention will appear more fully from the following description thereof, reference being had to the accompanying drawing in which:

Figure 1 is a side view of a horse's head with the blinker and eye shield in place;

Fig. 2 is a perspective view of the eye shield attached to the blinker;

Fig. 3 is a similar view of a detached eye shield;

Fig. 4 is a front view of the eye shield;

Fig. 5 is a view thereof looking down from the top;

Fig. 6 is a section on the line 6—6 of Fig. 4, and Fig. 7 is a section on the line 7—7 of Fig. 4.

The device comprises a foundation 10 for supporting the eye shield, which foundation may be in the form of the usual blinker consisting of a fabric hood 11 having fastening straps 12 and ear apertures 13, either with or without the ordinary cup-shaped leather blinders 14. Any other suitable foundation or means may be used for supporting the eye shield in place on the horse's head.

The eye shield 15 may be made from a sheet of transparent plastic material and it may be molded, swaged, or otherwise formed to shape. I have found that "Vinylite," a plastic material made of vinyl copolymer resins, is especially suitable since it has what is called a static charge that acts to dispel any moisture of condensation formed on the surfaces of the sheet, and thus obviate clouding. I do not however limit my invention to that particular material since other non-shatterable transparent plastic materials, that will not readily cloud or fog, and that have sufficient strength may be employed.

The shield, which is preferably made from a single piece of material, is shaped to form a relatively flat portion 16 that extends across the horse's face, covering both eyes, and that terminates at its sides in rearwardly curved wings 17. The top portion 18 slopes rearwardly from the face portion 16, corners 19 being formed at the juncture of these portions to hold the face portion away from the horse's eyes and to provide sufficient space to accommodate the blinders 14 where such are used. The middle of the shield is preferably curved, as indicated at 20, to conform generally to the curvature of the horse's head. Ventilating holes 21 may be formed along the rear edge of the top portion 18.

The shield 15 may be attached to the foundation 10 either permanently or detachably in any suitable manner as, for instance, by sewing. When the shield is sewn to the foundation it is advisable to provide the shield with pre-formed stitching holes 22 along its top and bottom edges and also, if desired, along the middle line 20. In fastening the shield to the foundation the wing portions 17 are left free from attachment.

The design of the shield is streamlined to offer minimum wind resistance and it is spaced sufficiently from the eye of the horse so as not to cause any annoyance or discomfort but at the same time to protect the eyes from injury even though the shield be indented by flying particles of matter.

I am aware that it has heretofore been proposed to apply transparent shields directly over the eyes of a horse but such shields have not proven satisfactory in use.

While I have described a preferred form of the improved eye shield, it is to be understood that modifications in the details of construction thereof may be made within the spirit and scope of the invention.

What I claim is:

1. A horse eye shield comprising a fabric hood adapted for attachment to a horse's head in the region of the eyes, and a sheet of transparent plastic material secured along its upper and lower edges to the hood, said plastic sheet being shaped to form a relatively flat front portion covering both eyes and spaced outwardly therefrom, a top portion and rearwardly curved lateral wings, said wings being free from attachment to the hood to prevent clouding of the shield.

2. A horse eye shield comprising a fabric hood for attachment to a horse's head in the region of the eyes, and a shield of transparent plastic material mounted on the front of the hood and extending across both eyes, said shield being spaced outwardly from the front of the hood and being attached only along its upper and lower edges to the hood.

KENT MILLER.